United States Patent [19]
Ward et al.

[11] Patent Number: 5,279,743
[45] Date of Patent: Jan. 18, 1994

[54] PROCESS OF USING CHLORIC ACID TO SEPARATE ZINC OXIDE AND MANGANESE OXIDE

[75] Inventors: Leslie R. O. Ward; David W. Cawlfield, both of Cleveland, Tenn.

[73] Assignee: Olin Corporation, Cheshire, Conn.

[21] Appl. No.: 987,503

[22] Filed: Dec. 7, 1992

[51] Int. Cl.⁵ .............................................. B01D 11/04
[52] U.S. Cl. ...................................... 210/638; 210/634
[58] Field of Search ....................... 210/634, 511, 638; 423/320, 49, 419R, 17.25, 140, 139

[56] References Cited

U.S. PATENT DOCUMENTS 3,640,683  2/1972  Miyazaki et al. ...................... 423/49
4,402,931  9/1983  Tanabe et al. ................ 423/419 RX Primary Examiner—Frank Spear
Attorney, Agent, or Firm—Gregory S. Rosenblatt; William A. Simons

[57] ABSTRACT

A process for the separation of a mixture of zinc and manganese oxides by adding the mixture to a chloric acid solution whereby the chloric acid solution oxidizes solid manganese oxide to solid manganese dioxide and causes the zinc oxide to dissolve into soluble zinc ions. The solid manganese dioxide is then separated from the chloric acid solution containing zinc ions.

12 Claims, 5 Drawing Sheets

PROCESS OF USING CHLORIC ACID TO SEPARATE ZINC OXIDE AND MANGANESE OXIDE

BACKGROUND OF THE INVENTION

The recycling of used batteries is a relatively simple process which starts with expended or defective batteries being milled and then passed through a magnetic separator to remove the iron battery jacket. The resulting iron free mixture of compounds is heated to temperatures in excess of 300 degrees Celsius and washed to yield, among other things, a mixture of zinc and manganese oxides. This mixture is stable and non polluting. This recycling process is advantageous because it results in the production of a stable non toxic zinc and manganese oxide complex from potentially toxic battery waste. The disadvantage has been that it has not previously been possible to separate the mixture of oxides using existing processing methods. This has resulted in the waste of significant quantities of zinc and manganese metals. It has now been surprisingly found that mixtures of zinc and manganese oxides can be separated to yield substantially pure zinc oxide and substantially pure manganese dioxide. Both of these products have commercial uses.

The compounds that are the subject of this reaction are known in the art. Zinc oxide is a white solid that has a molecular weight of 81.38. It has a melting point of 1,975 degrees Celsius and is soluble in acid, alkali and ammonium chloride. Zinc oxide is insoluble in alcohol and ammonia. Because of its use in the vulcanization process the rubber industry is the largest user of zinc oxide. In addition to many other uses, zinc oxide has also been used as an ingredient in paints, as a trace element nutrient for agricultural products and as a photocopying aid.

Manganese oxide, $Mn_3O_4$, has a molecular weight of 228.81 and is thermally the most stable manganese oxide. It forms black rhombic crystals that have a melting point of 1564 degrees Celsius. Manganese oxide is soluble in hydrochloric acid but insoluble in hot and cold water. Manganese dioxide, $MnO_2$, is a naturally occurring substance that has a molecular weight of 86.94. It forms black crystals that have a melting point of $-0.535$ degrees Celsius. Manganese dioxide is soluble in hydrochloric acid and is insoluble in nitric and acetic acids. Manganese dioxide finds practical importance in the production of potassium permanganate.

Chloric acid is a strong oxidizing agent whose oxidizing properties vary somewhat with the pH and temperature of the solution. It is fairly stable in cold water solutions of up to about 30% by weight. Upon heating, chlorine and chlorine dioxide may be evolved depending upon the strength of the solution. Concentrations of chloric acid by evaporation under reduced pressure may be carried to greater than 40%. Such evaporation is accompanied by the evolution of chlorine and oxygen and the formation of perchloric acid.

This invention relates to a novel means of separating mixtures of zinc oxide and manganese oxide using a solution of chloric acid.

DESCRIPTION OF THE PRIOR ART

The accepted method of separating mixtures of metal oxides is treatment of the mixture with a reducing agent and an acid to dissolve the mixture. This is followed by the electrolysis to produce substantially pure metals at different electrodes. Another method of separating zinc oxide from manganese oxide involves smelting the mixture. In this process the mixture is heated in a reducing environment to yield low quality zinc. This method does not result in the recovery of manganese.

OBJECTS OF THE INVENTION

It is the object of this invention to provide a means of separating all of the zinc oxide from all of the manganese dioxide in a mixture of zinc and manganese oxides. It is a further object of this invention to provide a means of using chloric acid to oxidize manganese oxide to manganese dioxide. Still further, it is an object of this invention to provide a method of using chloric acid to oxidize manganese to different valences. It is another object of this invention to provide a method of using chloric acid to selectively separate zinc oxide from a mixture of zinc and manganese oxides. Other objects will be apparent to those skilled in the art to which this invention pertains.

SUMMARY OF THE INVENTION

This invention relates to a novel process for the separation of mixtures of zinc and manganese oxides using chloric acid. A mixture of zinc and manganese oxides is added to a solution of concentrated chloric acid thereby causing the zinc oxide to dissolve leaving manganese dioxide in a solid form. The chloric acid solution effectively oxidizes solid manganese oxide to solid manganese dioxide. The solid manganese dioxide is separated from the chloric acid solution containing zinc ions and then dried. The filtrate containing dissolved zinc is neutralized with base causing the precipitation of zinc oxide, a white solid. The zinc oxide is separated from the solution and dried.

BRIEF DESCRIPTION OF THE DRAWINGS

FIG. 2 indicates a significant reduction of the amount of zinc as compared to the mixture used in FIG. 1.

DETAILED DISCUSSION

Figure 1:
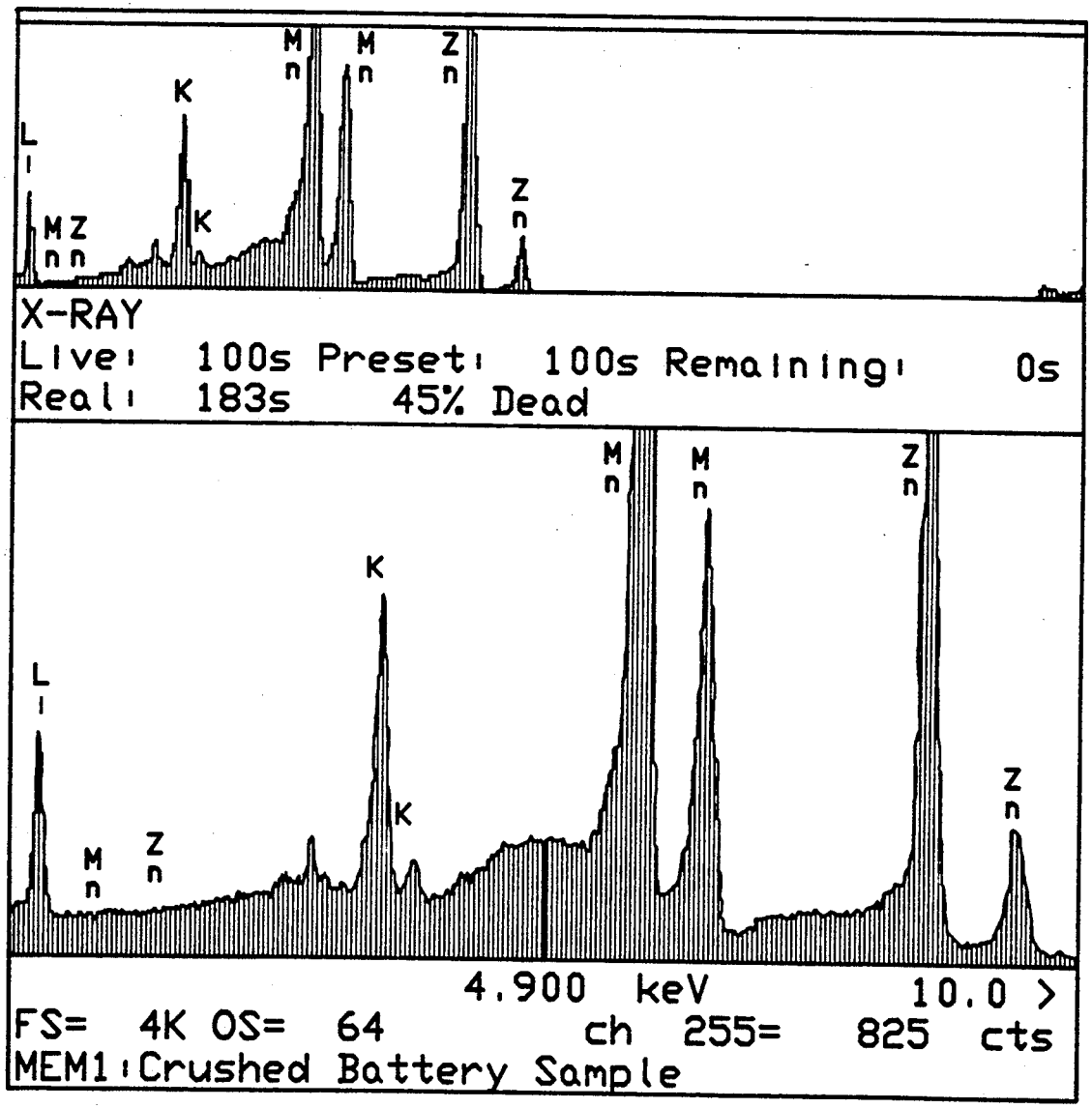
FIG. 1 represents the X-Ray Flouresence Spectroscopy ("XRF") analysis of a mixture of manganese and zinc oxides obtained from a milled battery.

Mixtures of zinc oxide and manganese oxide exist in various forms that present a unique problem in the separation art. While the individual compounds are of value, the mixture has been considered useless because a means of separating the individual compounds has not been known. In fact the mixture of manganese and zinc oxides has often been used as landfill. In the past, research effort has been directed to finding a form of the mixture that would be non toxic to the environment. It has now surprisingly been found that chloric acid can be used to separate mixtures of zinc and manganese oxides no matter what form the mixture takes. Instead of being used as landfill the individual compounds can be separated into substantially pure forms that have utility in the manufacture of batteries.

The claimed process involves the addition of a solution of chloric acid to a mixture of zinc oxide and manganese oxide to form a two phase reaction mixture having a solid phase and a liquid phase. The mixture of zinc oxide and manganese oxide can be a solid or a liquid. The solid form can be a mixture of granules of zinc oxide admixed with granules of manganese oxide or a complex of magnesium oxide and zinc oxide having a crystal lattice structure. The claimed process is applicable to all forms of mixtures of zinc oxide and manganese oxides.

It is hypothesized that the manganese oxide is oxidized to solid manganese dioxide while the zinc dissolves into the chloric acid solution according to the following reaction:
Reaction (1):

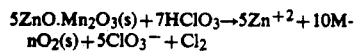

The novelty of this reaction is theorized to result from the direct oxidation of $Mn_2O_3$ to $MnO_2$ without the formation of $Mn^{2+}$ ions. Manganese ions do not appear to be formed in the claimed process resulting in the selective dissolution of only zinc oxide in chloric acid. This oxidation of manganese using chloric acid may have applications in any reaction involving changing the valence of manganese. Different manganese oxides and mixtures of different manganese oxides may be present in the claimed process. Solutions having different concentrations of chloric acid can be used in the claimed invention. Optimal chloric acid concentrations are from about 5 to about 40 weight percent chloric acid. In addition to the use of pure chloric acid, the separation of zinc oxide and manganese oxide can be accomplished using chloric acid containing sodium chlorate. Sulfuric acid and sodium chlorate may also replace the pure chloric acid although using these reagents does not produce as good results. Oxidizing agents such as hypochlorous acid and acids such as perchloric acid may be used in conjunction with, or as replacements to the chloric acid. The formation of a mixture having a solid phase comprising manganese dioxide and a liquid phase comprising a solution of chloric acid having zinc ions therein generally occurs at a temperature from about 80 degrees Celsius to about 100 degrees Celsius because of an exothermic reaction.

The solid phase containing manganese dioxide is separated from the liquid phase and dried to yield substantially pure manganese dioxide. The separation may be carried out using any standard separation technique. Filtration was the preferred method of separation employed in the examples. The manganese dioxide may be dried using any standard drying technique. The preferred method of drying was placing the manganese dioxide in an oven and subjecting the compound to elevated temperatures. Although any elevated temperature may be used, the preferred temperature is from about 70 degrees Celsius to about 90 degrees Celsius.

The liquid phase is treated with concentrated sodium hydroxide which reacts with the dissolved zinc to form a white zinc oxide precipitate according to the following reaction:

Reaction (2):

Although the use of sodium hydroxide is illustrated above, any base that would cause precipitation of zinc oxide may be used. The optimal pH range for the precipitation of said zinc oxide is from about 5 to about 10. The solid zinc oxide is separated from the chloric acid solution and dried. Any standard separation technique may be used to separate the solid zinc oxide from the neutralized solution of chloric acid. In laboratory tests, vacuum filtration was the preferred means of separating the solid from the liquid. The solid may be dried using any means known to one of ordinary skill in the art for achieving that purpose. In the preferred embodiment the solid zinc oxide is dried in an oven at an elevated temperature. Although any elevated temperature may be used, a temperature in the range of from about 70 degrees Celsius to about 90 degrees Celsius is preferred.

In a preferred embodiment of the claimed reaction, the manganese dioxide separated from the chloric acid solution above is subjected to a second exposure of chloric acid to remove any remaining zinc. In this step 35 weight percent chloric acid is added to the solid remaining after the mixture of manganese and zinc oxides is first exposed to chloric acid. This step is carried out at an elevated temperature. The preferred temperature is above about 25 degrees Celsius.

EXAMPLES

Having described in general the method of operation of the instant invention, the following examples are provided to further described the claimed invention:

EXAMPLE 1

Figure 2:
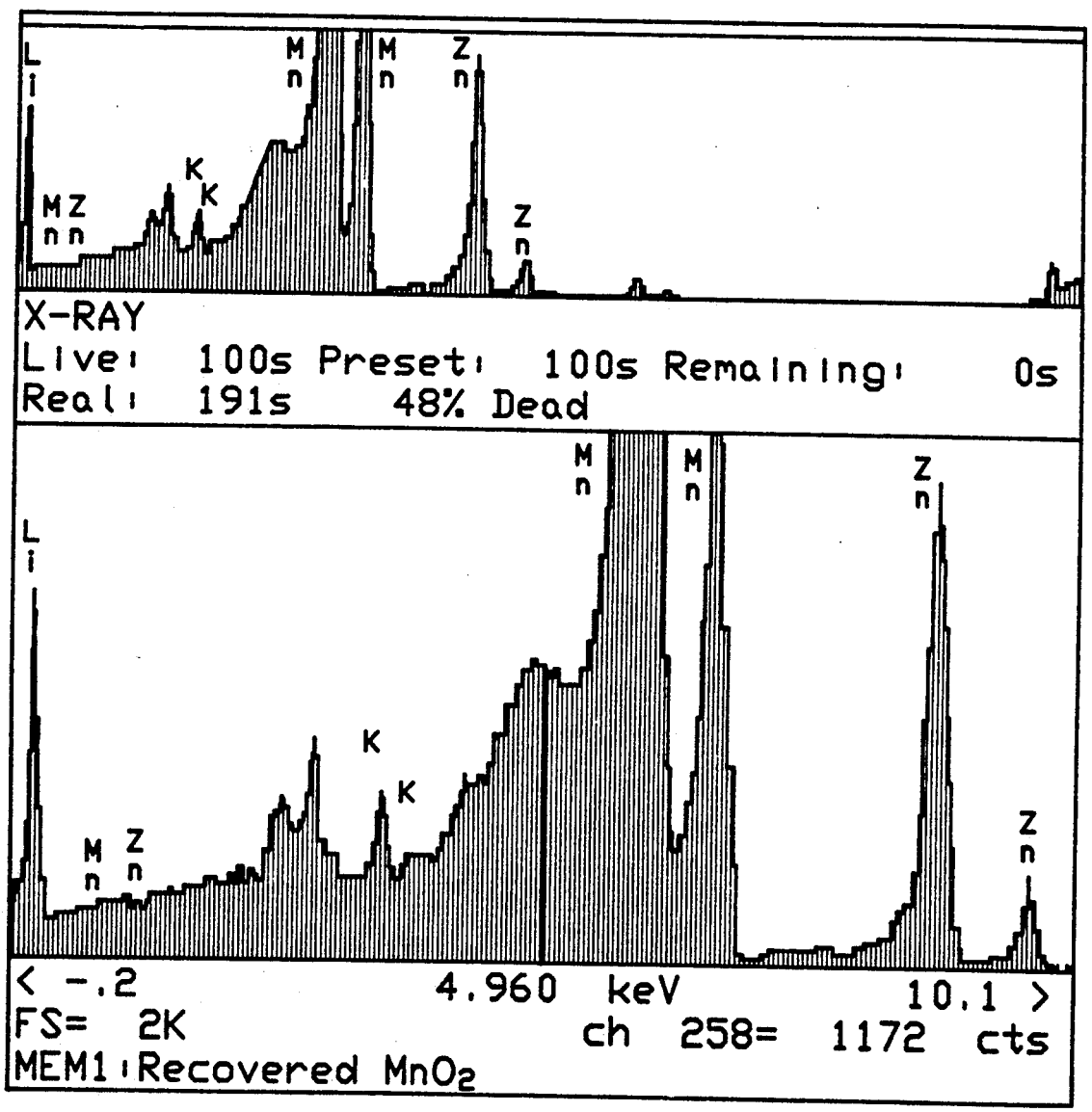
FIG. 2 is the XRF analysis of manganese dioxide recovered using the claimed process from the mixture used in FIG. 1.
Figure 3:
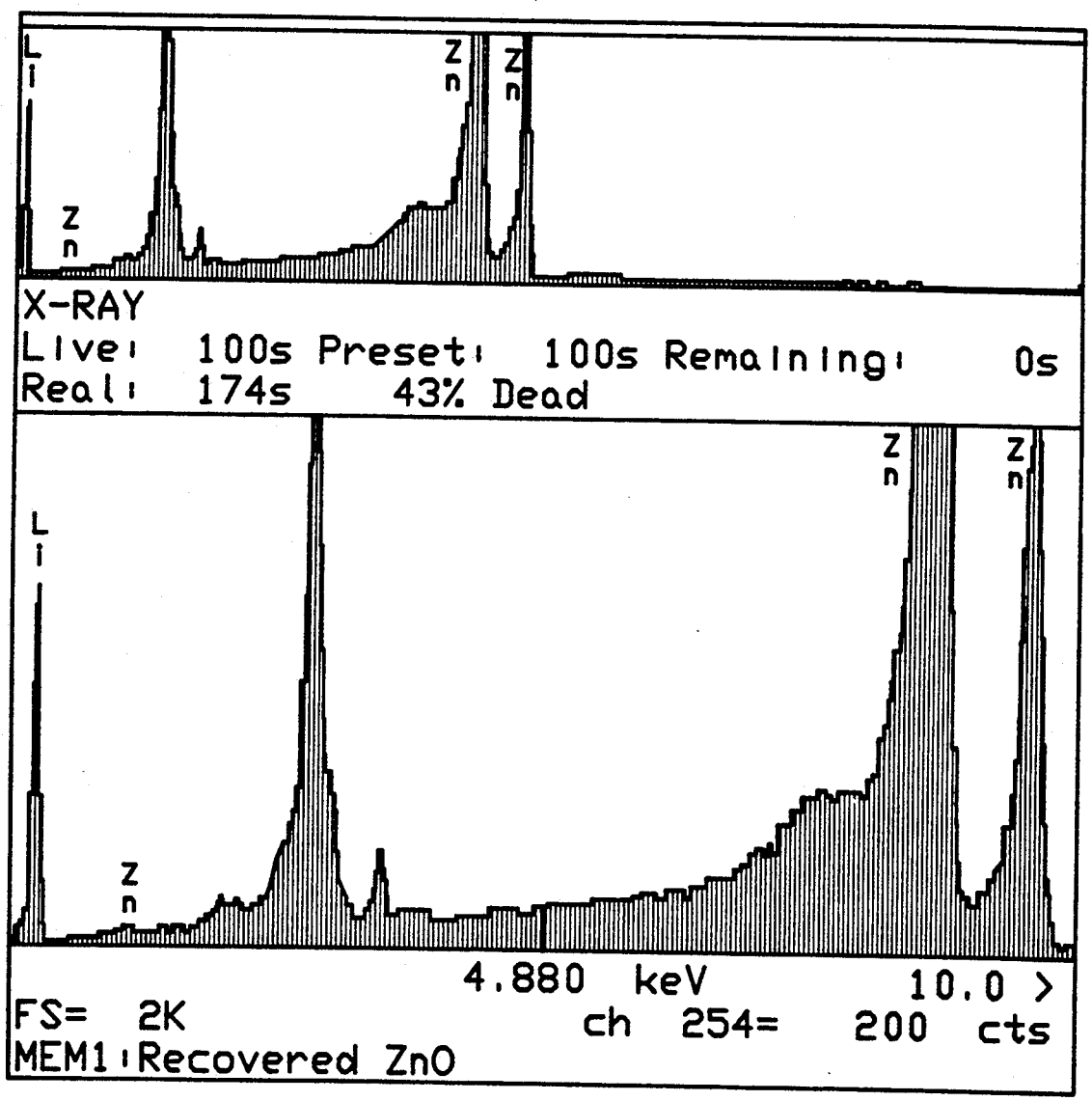
FIG. 3 is the XRF analysis of zinc oxide and indicates the complete removal of the manganese oxides contained in the mixture used in FIG. 1.

100 grams of mixed manganese and zinc oxides were slowly added to 200 grams of 39.45 weight per cent chloric acid. The temperature of the mixture increased to 97 degrees Celsius due to the exothermic nature of the reaction. The mixture was stirred for one hour, diluted 10:1 with distilled, de ionized water and filtered using a water aspirated Buchner funnel. The black manganese dioxide was retained for analysis. The filtrate was neutralized with 50 weight percent sodium hydroxide which precipitated the zinc as zinc oxide. The mixture was filtered using a water aspirated buchner funnel and the white zinc oxide was retained for analysis. After analysis both the manganese dioxide and the zinc oxide were dried in an oven at 70 degrees Celsius. FIG. 1 represents an XRF analysis of the original sample of mixed manganese and zinc oxides. FIG. 2 is the XRF analysis of the recovered manganese dioxide which illustrates a significant reduction in the amount of zinc compared to the analysis of the original sample. FIG. 3 is the XRF analysis of the recovered zinc oxide which demonstrates the complete removal of manganese oxides contained in the original sample.

EXAMPLE 2

Figure 4:
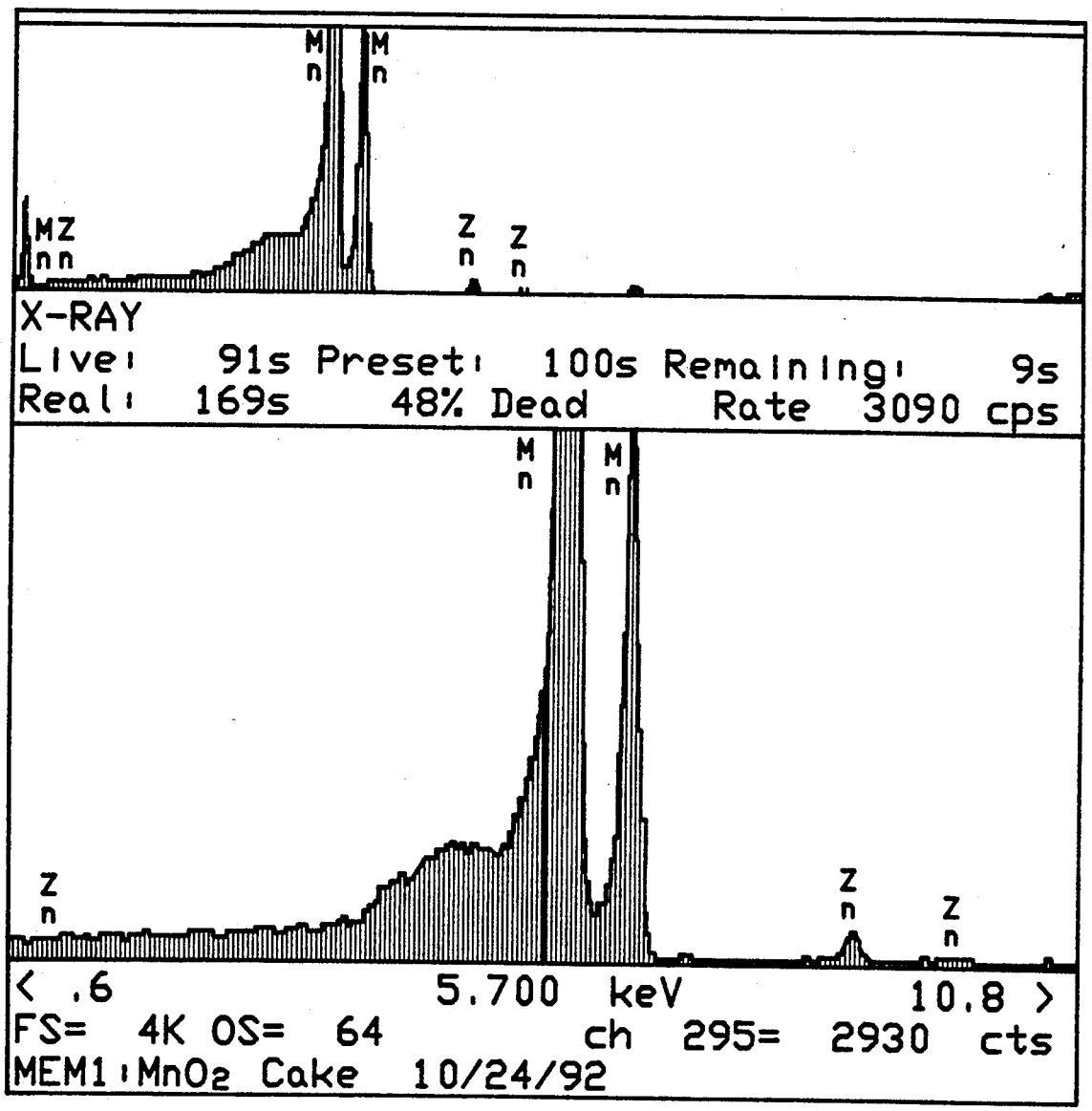
FIG. 4 is the XRF analysis of the recovered manganese dioxide from a second mixture of manganese and zinc oxide.
Figure 5:
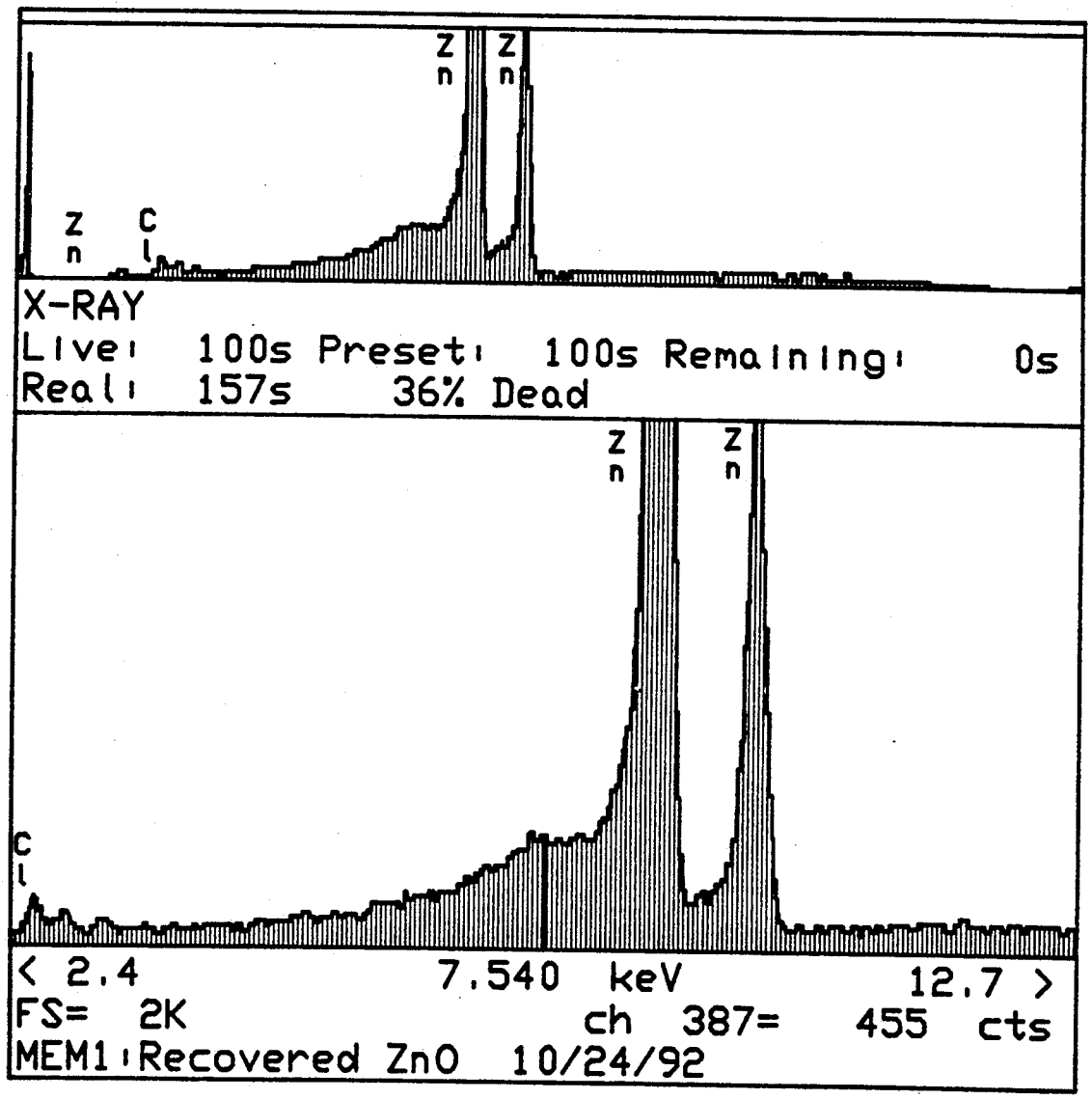
FIG. 5 represents the XRF analysis of the zinc oxide recovered using the claimed process on the mixture used in FIG. 4. Complete removal of manganese oxide is indicated in FIG. 5.

240 grams of the mixed manganese and zinc oxides were slowly added to 480 grams of 39.45 weight per cent chloric acid. The temperature of the reaction increased from 22 degrees Celsius to 84 degrees Celsius due to the exothermic nature of the reaction. The mixture was stirred for 30 minutes, diluted 10:1 with distilled, de ionized water, and filtered using a water aspirated buchner funnel. The filtrate was retained and labeled as filtrate #1. The recovered manganese dioxide was then slowly added to an additional 200 grams of 39.45 weight per cent chloric acid. The mixture was heated and stirred at 70 degrees Celsius for 30 minutes. The manganese dioxide was filtered from solution as before and retained for analysis. This filtrate was labeled filtrate #2. Both filtrates #1 and #2, were neutralized using 50 weight per cent sodium hydroxide and filtered using a water aspirated buchner funnel. Approximately 98% of the zinc oxide precipitate was recovered from filtrate #1 with the remainder recovered from filtrate #2. FIG. 4 is the XRF analysis of the recovered manganese dioxide. The results indicate that a greater amount of zinc is removed by the second treatment of the manganese dioxide solids with chloric acid. FIG. 5 represents the XRF analysis of the recovered zinc oxide and shows complete removal of the manganese oxides.

EXAMPLE 3

A sample of a mixture of zinc oxide and manganese oxide was added to a solution of 30 weight per cent hydrochloric acid. Chlorine gas was then bubbled through the solution for one hour. The solid precipitation was then filtered and analyzed. The analysis revealed minimal separation of manganese and zinc oxides.

The spirit and broad scope of the appended claims is intended to embrace all such changes, modifications and variations that may occur to one of ordinary skill in the art upon a reading of the disclosure.

Having thus described the invention, we claim:

1. A process for separating zinc oxide and manganese oxide comprising the steps of;
   a) adding a solution of chloric acid to a mixture of zinc oxide and manganese oxide to form a mixture having a solid phase comprising manganese dioxide and a liquid phase comprising a solution of chloric acid containing zinc ions therein;
   b) separating the solid phase from the liquid phase.

2. A process according to claim 1 wherein the liquid phase is treated with base to precipitate out the zinc oxide.

3. A process according to claim 2 wherein the base is sodium hydroxide.

4. A process according to claim 2 wherein said zinc oxide is separated from the liquid phase of the reaction.

5. A process according to claim 1 wherein said separated solid phase is dried to yield manganese dioxide.

6. A process according to claim 5 wherein said separated solid phase is mixed with a solution of chloric acid to dissolve any remaining zinc oxide and then the solution of chloric acid containing any remaining zinc oxide is separated from the remaining solid which contains substantially pure manganese dioxide.

7. A process according to claim 6 wherein said remaining solid is dried.

8. A process according to claim 7 wherein said chloric acid solution is treated with base to cause the precipitation of zinc oxide.

9. A process according to claim 1 wherein the temperature of the reaction is maintained at from about 80 degrees Celsius to about 100 degrees Celsius.

10. A method of using chloric acid comprising exposing a mixture of zinc oxide and manganese oxide to a solution of chloric acid to selectively dissolve the zinc oxide.

11. A method of separating a mixture of zinc oxide and manganese oxide wherein said mixture of oxides is added to a solution of chloric acid to form a reaction mixture with a liquid phase and a solid phase, said liquid phase being separated from said solid phase after zinc oxide has dissolved into said liquid phase.

12. A process according to claim 1 wherein the solution of chloric acid has a chloric acid concentration of from about 5 to about 40 weight percent.

* * * * *